US006545439B2

(12) United States Patent
Kaeufl et al.

(10) Patent No.: US 6,545,439 B2
(45) Date of Patent: Apr. 8, 2003

(54) METHOD AND CIRCUIT ARRANGEMENT FOR DETECTING MOTION, DIRECTION AND POSITION OF A PART DRIVEN BY AN ELECTRIC MOTOR

(75) Inventors: Georg Kaeufl, Maierhofen (DE); Erwin Kessler, Saulgau (DE); Erich Liepold, Koesching (DE); Werner Pollersbeck, Pfoerring (DE); Reinhold Roedel, Abensberg (DE); Wolfgang Schulter, Meersburg (DE); Klaus Spreng, Ingolstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/912,256

(22) Filed: Jul. 23, 2001

(65) Prior Publication Data

US 2002/0008483 A1 Jan. 24, 2002

Related U.S. Application Data

(63) Continuation-in-part of application No. 09/433,191, filed on Oct. 25, 1999, now abandoned.

(30) Foreign Application Priority Data

Oct. 27, 1998 (DE) .......................... 198 49 430
Dec. 4, 1998 (DE) .......................... 198 55 996

(51) Int. Cl.[7] ................................. H02P 7/00

(52) U.S. Cl. .................. 318/280; 318/281; 318/283; 318/254; 318/290; 318/432; 318/434; 318/445; 318/466; 318/266

(58) Field of Search ................ 218/280, 283, 218/432, 434, 466, 281, 290, 445, 254, 266

(56) References Cited

U.S. PATENT DOCUMENTS

| 4,319,170 A | | 3/1982 | Brent |
| 4,441,076 A | * | 4/1984 | Baum .......................... 324/158 |
| 5,378,976 A | | 1/1995 | Inaji et al. |
| 5,714,854 A | * | 2/1998 | Mizuta et al. .............. 318/266 |
| 5,754,017 A | * | 5/1998 | Tsige et al. ................. 318/286 |
| 5,780,988 A | * | 7/1998 | Kalb et al. ................... 318/603 |
| 5,796,231 A | * | 8/1998 | Kyodo ........................ 318/608 |
| 5,966,071 A | * | 10/1999 | Tsuge et al. ................ 340/438 |
| 6,150,784 A | * | 11/2000 | Nagaoka ..................... 318/467 |
| 6,281,647 B1 | * | 8/2001 | Sasaki ........................ 318/264 |

FOREIGN PATENT DOCUMENTS

| DE | 4315637 | 11/1994 | | |
| DE | 19733581 | 10/1998 | | |
| EP | 0359853 | 3/1990 | | |
| EP | 0603506 | 6/1994 | | |
| JP | 63-304307 | 12/1988 | | |
| JP | 07-222477 | 8/1995 | | |
| JP | 11-062380 | * | 3/1999 | ........... E05F/15/00 |
| JP | 11-078514 | * | 3/1999 | .............. B60J/1/00 |

* cited by examiner

Primary Examiner—Shih-Yung Hsieh
Assistant Examiner—Tyrone Smith
(74) Attorney, Agent, or Firm—W. F. Fasse; W. G. Fasse

(57) ABSTRACT

An electric motor for driving a component, such as a vehicle window lifter or a machine tool, functions as a generator, when the motor drive voltage is switched off and the motor is short circuited. The motor keeps running due to inertia or other influences. During this period after switch-off a generator voltage and respective generator current are produced. The generator current is measured for various purposes, preferably in combination with a measured r.p.m. signal. The generator current signal alone, or in combination with the r.p.m. signal, is evaluated to provide information regarding the motion of the driven component including information regarding the motion direction and position of the component.

29 Claims, 7 Drawing Sheets

METHOD AND CIRCUIT ARRANGEMENT FOR DETECTING MOTION, DIRECTION AND POSITION OF A PART DRIVEN BY AN ELECTRIC MOTOR

CROSS-REFERENCE TO RELATED APPLICATION

The present application is a Continuation-In-Part application of U.S. Ser. No. 09/433,191, filed on Oct. 25, 1999 now abandoned.

PRIORITY CLAIM

This application is based on and claims the priority under 35 U.S.C. §119 of German Patent Applications No. 198 55 996.8, filed on Dec. 4, 1998, and No. 198 49 430.0, filed on Oct. 27, 1998, the entire disclosures of which are incorporated herein by reference through the parent case U.S. Ser. No. 09/433,191 the priority of which is also claimed under 35 USC 120.

FIELD OF THE INVENTION

The invention relates to monitoring a part driven by an electric motor. The part may, for example, be a motor driven vehicle window or a tool. In many instances it is desirable to provide information whether a part driven by an electric motor is moving, if so in which direction the part is moving, and which position has been reached. In the case of a vehicle window, especially a rear window, the respective information is used for controlling an electrically driven window lifter to provide an anti-jamming function. The invention also relates to a circuit arrangement for carrying out such monitoring.

BACKGROUND INFORMATION

A group of known devices for detecting the position and the direction of rotation of a power driven part makes use of 2-channel sensor systems which provide signals that are phase-shifted and evaluated in an electronic unit. The sensors used can operate in accordance with different physical principles, e.g. electrical, magnetic, inductive, and optical.

For example, the electric motor drive disclosed in EP 0,359,853 A1 makes use of two Hall sensors displaced at an angle to each other and allocated to a ring magnet attached to an armature shaft. When the armature shaft rotates, the two Hall sensors generate two correspondingly phase-shifted signals that are digitized and then evaluated in an electronic unit. After processing, the respective signals represent the only basis for identifying the direction of rotation. Since the corresponding signal pattern is characteristically different for each direction of rotation, the counted pulses can be allocated unequivocally to a definite direction of rotation.

However, the known technical solution mentioned above requires no fewer than two sensor channels, whereby it needs a correspondingly high number of components and conductors for its implementation. Also, the construction space to be provided for the installation can have a negative effect, especially when using small drive units with integrated electronics.

When only one such sensor is used, only one signal exists which is proportional to the number of the revolutions made by the motor and which is then allocated to one direction of motion of the driven part in accordance with the polarity of the motor drive voltage. The signal must be added to or subtracted from the previous position, whichever applies. Signal flanks that occur after the motor drive voltage has been switched off cannot be assigned.

Japanese Patent Publication JP 63-304307 A discloses a velocity control for a motor drive wherein the phase difference between a velocity control pulse and an incremental pulse of a length measuring laser device is continuously acquired. The control circuit used in said Japanese disclosure further includes a pulse converter and a mechanism for transforming the rotary motion of the motor into a linear motion. An up or a down count signal is generated in a transformer from the measurement of the linear motion in accordance with the direction of the positioning command.

The teaching described above does permit a very accurate control of the adjustment velocity of a driven part but it is not suitable. for establishing at the same time its position. Further measures must be provided for this purpose.

Furthermore, German Patent Publication DE 43 15 637 C2 discloses a method for detecting the position and direction of rotation of a drive. Not only the signal flanks of the digitized sensor signal but also the status of the drive is taken into account in that in the event of a direction reversal of the rotation the signal flanks are allocated in accordance with an overshoot time that is limited by fixed time thresholds. On principle, these time thresholds can be determined empirically or calculated mathematically. Adaptation to widely varying system conditions is not possible because the variation of the motor current over a period of time when the direction of rotation reverses, varies by several orders of magnitude. In particular, a control with fixed thresholds is always limited solely to a specific load situation, which is essentially determined by the external moment to be overcome. A current rise due, for instance, to a window pane freezing or jamming does lead to deviations. In motor vehicles, the operating supply voltage can drop quite considerably if the battery is about dead and other electrical power using elements are also being operated. If the electric motor is used very frequently, as is the case, for example, in actuating drives on industrial machine tools, the electrical parameters of the motor also change because of the warming effect. If the time thresholds were to be placed so far apart that all these cases could still be detected, then a particularly smooth running actuator arrangement would perform several revolutions in the opposite direction before being detected by the threshold. 0,603,506 A2 describes a method for determining with a position encoder the position of a part driven in two directions by an electric motor in motor vehicles, wherein a change in the movement direction is to be identified according to the duration of a break period between two pulses from the position encoder.

Errors can occur in such a method due to a rapid change of direction or if the motion of the part is non-uniform and does not take place in a single step.

The applicant's DE 197 33 581 C1, which is not a prior publication, describes a method for measuring the motor current at the latest at the time of driving switching devices for the purpose of switching over the motor voltage from one direction of motion to the opposite direction. On changing the polarity of the externally supplied motor drive voltage, the motor current displays a characteristic curve due to the overshoot as a result of the mass inertia of the motor and the part moved by it, for instance the window pane and its mechanical drive transmission. A voltage that opposes this reversal of direction of motion is induced and superimposed on the external motor drive voltage and causes the characteristic curve of the motor current from which the actual moment in time for the reversal of direction of motion is derived as a function of time, which is considerably later than the time at which the motor drive voltage changes over. The signal flanks of the sensor signal are added to or subtracted from the actual position by the signal evaluation according to the actual direction of motion. This electromechanical behavior of d.c. motors is described by means of so-called motor equations.

In a series of tests it has been found, however, that because of other effects, deviations continue to occur in the position determination. These deviations are not negligible and cumulate over the life of a vehicle.

A substantial cause for the above mentioned deviations that continue to occur in the position determination are signal flanks that arise even after switching off the motor drive voltage. Particularly, after stopping the motor, an overshoot or run-out of the motor occurs because of inertia, which has been neglected heretofore. Such motor run-out can, however, continue for a duration corresponding to several motor revolutions causing respective signal flanks which are not evaluated or which are incorrectly evaluated. Further, this fault is not always compensated by a corresponding run-out in the opposite direction of motion.

The disclosure of Japanese Patent Publication JP 07-222477 A, published on Aug. 18, 1995 has recognized that each of these changes in the motor rotation direction results in a voltage induction in accordance with the generator principle. These deviations, however, occur when the motor is already switched off from the motor drive voltage. Therefore, it is possible to ascertain the generator voltage and to make possible an allocation of the generator voltage signal flanks to the actual motion direction.

For a number of uses it is, however, necessary to stop the motor as quickly as possible. Such stopping takes place conventionally by short-circuiting the winding terminals of the motor. A respective circuit arrangement for a braking action is, for example disclosed in U.S. Pat. No. 4,319,170. However, the rotation direction of the motor is not taken into account in the known braking action circuit.

As is disclosed in said JP 07-222477 A, the generator voltage cannot be measured or ascertained during the existence of the short-circuit. Therefore, it is suggested in Japanese publication JP 07-222477A to open again briefly the switches that short-circuit the motor to cause a brief no-load run and to measure and evaluate the generator voltage that occurs during this no-load run. Such a temporary ascertaining of the generator voltage, however, requires a noticeably increased effort and expense for the motor control and delays the braking action of the motor. Moreover, the method according to the above Japanese publication is still subject to deviations due to erroneous allocation of signal flanks.

OBJECTS OF THE INVENTION

In view of the foregoing it is the aim of the invention to further improve and to simultaneously simplify a method for recognizing the motion, the motion direction and the position of a component that is driven by an electric motor, which for example, opens or closes a car window. It is also an object to provide a circuit arrangement for the performance of said method. Another important object of the invention is to determine the rotation direction of an electric motor that has been short-circuited for applying a quick braking action to the electric motor without the need for any temporary interruption of the short-circuit of the motor.

SUMMARY OF THE INVENTION

A motion direction of a component drivable by an electric motor is detected according to the following steps. First, the electric motor is switched on for rotation in a desired direction of rotation by applying a respectively polarized motor drive voltage to the windings of the electric motor. Second, the polarized motor drive voltage of the electric motor is switched off and the electric motor is simultaneously short-circuited while the motor keeps running by reason of inertia whereby the motor temporarily operates as a generator which generates or induces a generator or inertia current. Third, the induced generator current or inertia current of said electric motor following the switch-off is measured or sensed to provide a motion signal that contains motion and motion direction information regarding the motion of the drivable component. The motion direction is based on the polarity of the induced generator current. Fourth, the motion signal is evaluated to obtain said motion and direction information for further use, such as controlling the motor. Short-circuiting the motor while measuring or sensing the inertia current has the advantage that the time duration of continued rotation following switch-off is reduced and the circuit arrangement is simplified.

According to the invention there is further provided a circuit arrangement for measuring an induced generator current that is produced by inertia rotation of an electric motor following stopping said electric motor by short-circuiting. The present circuit arrangement includes the electric motor, a drive voltage source ($U_B$) and a reference potential connectable or connected to the motor through switching devices for operatively connecting windings of said electric motor to said operating voltage source and to said reference potential for normally driving said electric motor to rotate in a desired rotation direction. At least one voltage drop producing electric circuit element such as a measuring resistor or a diode or even a diode inherent in the switching devices is operatively connected to the electric motor. The switching devices are further connectable for short-circuiting the electric motor through the at least one voltage drop producing electric circuit element for inducing a voltage drop that is proportional to the induced generator current. At least one electric measuring circuit is connected to the voltage drop producing electric circuit element for measuring the voltage drop and for producing a measured signal representing the induced generator current.

By short-circuiting the drive motor for applying a breaking action and measuring an induced generator current also referred to as inertia current that is generated by the motor run-out caused by inertia, the invention achieves the important advantage that the generator current can be continuously measured during the run-out without interrupting the active braking action applied to the motor. More specifically, interrupting the short-circuiting of the motor is avoided. Further, by measuring the generator current during run-out following the short-circuiting a more precise control is assured because a number of deviations are now taken into account which heretofore went unrecognized. As a result, sensed signal flanks are correctly allocated to the respective movement direction. Thus, the method of the invention is capable of taking into account deviations that can be caused by external forces outside the drive system for the operation of the motor driven component such as a car window. For example, mechanical vibrations which move the component, or a spring-back action when the component encounters a stop, can cause such deviations. Any structural elements such as rubber dampers inside the motor, tension springs forming enclosures of a cable pull connecting the motor to the movable component or rubber buffers or seals have a certain elasticity that can cause the spring-back action, since these elements are first tensioned by the run-out of the motor whereby energy is stored and then dissipated by causing the spring-back action. Any deviations caused by the above mentioned structural elements are taken into account by the invention.

Further embodiments of the present method take all run-out and spring-back characteristics of the component drive system into account as well as the motion direction of the driven component prior to switch-off and any motion in the opposite direction due to said spring-back. Moreover, other movements of the motor can be detected. Such other motor movements are, for example, caused by mechanical forces, while the motor drive voltage is switched off. The features of the further embodiments are capable to take such motor movements into account. Once the motion direction is ascertained and known the signal flanks of the sensor output signals can be added to or subtracted from the previous component position thereby providing motion direction information.

The circuit arrangement according to the invention comprises in the short-circuit branch an electrical circuit element for producing a voltage drop between the motor winding terminals which are short circuited for stopping the motor. For example, separate measuring shunt resistors can be used for this purpose. In another embodiment the internal resistance of a circuit element, particularly the motor switching device, is capable of producing a sufficiently large voltage drop that can be used for the present purposes.

The measuring resistor may be divided into several measuring resistors. Instead of providing the measuring resistor or shunt resistor as one or more separate circuit components, it is possible to provide the measuring resistor in the form of a printed circuit resistor. In another embodiment the voltage drop is measured across a diode which is connected to the circuit to be conducting in the generator current flow direction so as to pass the generator current that is produced as a result of short-circuiting the motor. The conductive state voltage drop across the diode is approximately 0.7 volts which corresponds to the given threshold generator voltage. Compared to measuring a voltage drop across a resistor, the diode has the advantage of a considerably lower internal resistance. In both instances the voltage drop is a measure for the respective generator current.

The present circuit arrangements permit not only measuring of the generator current. Rather, the present circuits can also be used for measuring the motor drive current when the motor drive voltage is applied, in particular also for detecting the time at which a reversal of a motion direction takes place when changing the direction of the motor drive voltage.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
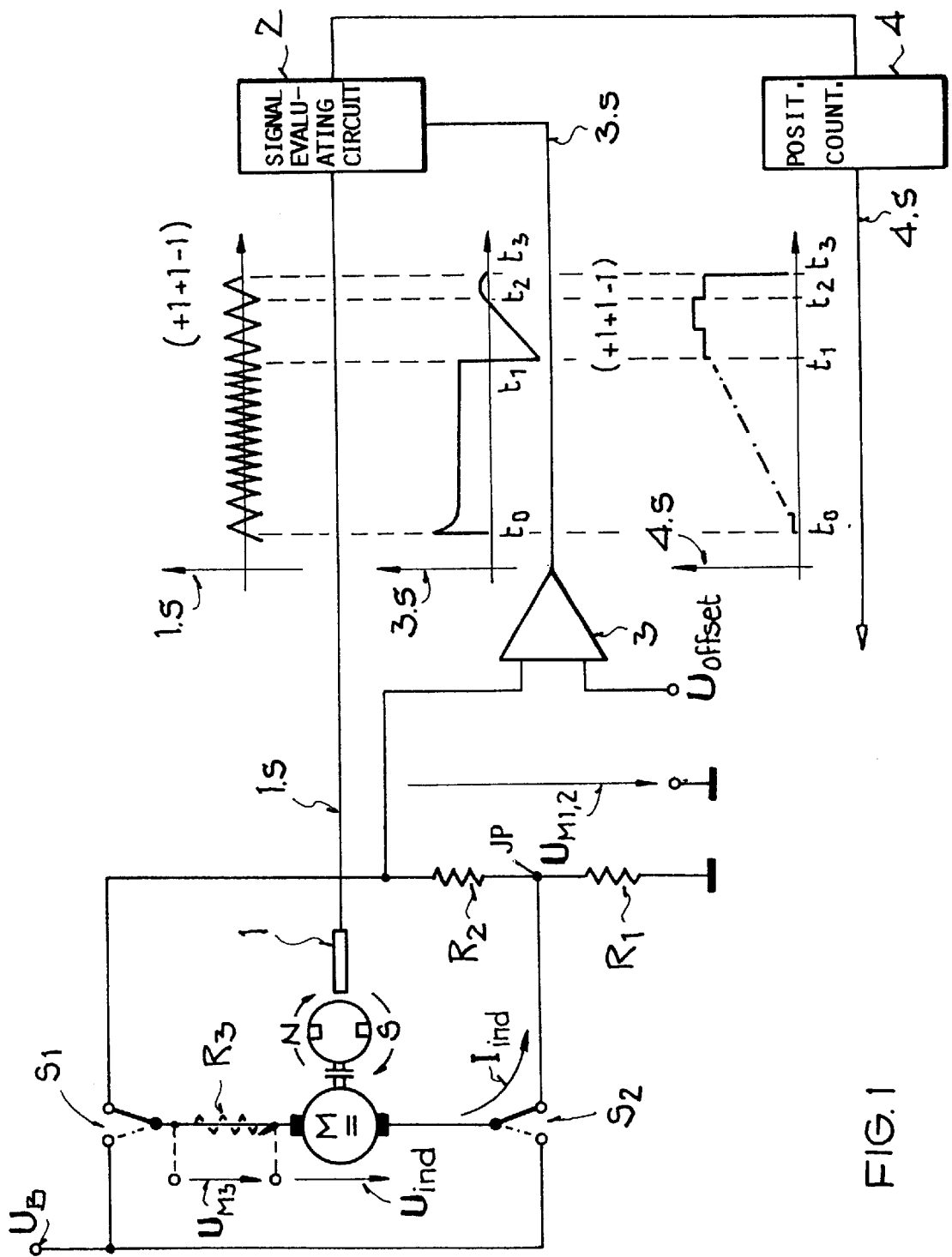
FIG. 1 shows a schematic circuit arrangement for switching off and short-circuiting an electric motor M for detecting the motion, the direction of motion and the position of a component that can be moved by the electric motor M.

FIG. 1 shows schematically a circuit arrangement for detecting the motion, the direction of motion and the position of a component or part that is drivable by an electric motor M. The motor M is connected on the one side by two switching devices $S_1$, $S_2$ to the motor drive voltage $U_B$ and on the other side to the reference potential (ground $\perp$). For driving the motor by the motor drive voltage $U_B$ one of the two switching devices $S_1$ or $S_2$ is connected to the source of the drive voltage $U_B$ and the other switching device $S_2$ or $S_1$ is connected to the reference potential such as ground $\perp$. Thus, the motor M is driven by a polarization of the motor drive voltage $U_B$; this polarization can be set by the switching devices $S_1$, $S_2$ to correspond to a desired direction of motion. In the shown position of the switches $S_1$, $S_2$ the motor M is short-circuited. More specifically, to switch off the motor M, both switching devices $S_1$ and $S_2$ are connected to the reference potential such as ground so that no further external motor drive voltage is applied to the motor M.

The switching terminals of the switching devices $S_1$, $S_2$ connected to the reference potential are short-circuited through a shunt resistor $R_2$ and linked through a measuring resistor $R_1$ to the reference potential $\perp$ so that the junction point JP between $R_1$ and $R_2$, to which all switching points are connected, is always connected to the reference potential. Other embodiments of a circuit component that suitably produces the voltage drop representing the generator current, are described in conjunction with FIG. 4.

The measuring circuit 3 is realized in this example embodiment as an amplifier circuit which measures the voltage drop $UM_{M1,2}$ across $R_1$ and $R_2$ relative to the reference potential $\perp$. To further simplify the following signal processing, the amplifier is operated with an offset voltage $U_{offset}$ which makes it possible, on the basis of the positive amplitude, to evaluate a signal that has been shifted into the positive range instead of a signal that is subject to polarity (+, −). The evaluation unit 2 performs for this purpose, for example, an analog or digital comparison with threshold values, correlates the signal flanks of the sensor signal 1.S with a direction of motion and changes the relevant position counter 4 accordingly. The time at which the motion of the component ends can also be ascertained from the measured generator current by interpolation from individual, measured points.

FIG. 1 shows by dashed lines another possibility in which a measuring resistor $R_3$ is connected in series with the motor M between the switching devices $S_1$, $S_2$. The voltage drop $U_{M3}$ across a respective resistor $R_3$ is supplied to a measuring circuit arrangement. This embodiment is possible without more, but the voltage drop $U_{M3}$ has no direct reference potential and therefore floats so that correspondingly high-quality differential amplifiers must be used in the measuring circuit arrangement with an effective common-mode suppression, which involves higher costs. The generator current can, however in principle, be measured equally well by the measuring resistor $R_3$ whereby a movement, the direction of the movement and the position of the component can be determined from the signal flanks occurring when the measurement is made.

In this example embodiment of FIG. 1, the motor M drives a magnetic rotor with magnetic polarities N=north, S=south. A Hall sensor 1 is positioned for sensing the rotation of the magnetic rotor to generate a signal 1.S proportional to the number of motor revolutions that have taken place. Other types of sensors, such as an electrical touch-sensitive pulse generator or similar sensors may be used. However, this revolution signal 1.S does not permit any unambiguous correlation between the measured signals and a direction of motion. While the system is being driven by means of the motor drive battery voltage $U_B$, it can generally be assumed that the direction of motion corresponds to the selected polarity of the motor drive voltage. If the motor drive voltage $U_B$ is switched off, however, this correlation is no longer entirely certain because, apart from overshoot effects due to inertia, spring-back or similar effects can occur.

If a movement of the motor or of the movable parts coupled to the motor occurs while the motor drive voltage $U_B$ is switched off as shown in FIG. 1, a generator voltage $U_{ind}$ is induced which, due to the short-circuit, leads to a measurable generator current $I_{ind}$ flowing through a shunt $R_2$. The direction of this current $I_{ind}$ corresponds to the direction of the movement. There is a corresponding voltage drop across the shunt $R_2$ and this voltage drop is measured by a measuring amplifier 3. Due to the offset voltage $U_{offset}$, the amplified output signal 3.S will always be greater than zero in the range essential for the measurement. Since only the motion as such and its direction need be derived from the signal 3.S, the accuracy of measuring the size of the voltage drop is not critical.

The resistance $R_1$ and the measurement of the voltage drop $U_{M1,2}$ across $R_1$ and $R_2$ makes it possible for the measuring arrangement including the measuring amplifier 3, to also measure the motor drive current that flows through $R_1$ or through $R_1$ and $R_2$, depending on the position of the switching devices $S_1$, $S_2$, even when the motor drive voltage $U_B$ is applied during normal operation. This possibility is another advantage of the invention since it permits, for example, monitoring the drive motor operation.

If a motor is to be operated with several drive voltages or the number of windings is to be changeable by selecting certain motor winding terminals from several winding terminals, the shunt $R_2$ must always be arranged between those switching points that are provided for switching off the motor drive voltage. If there are sevaral such points, each must be equipped with a shunt $R_2$. However, since at any one time only one switching constellation (ON or OFF) can be assumed, a suitably adapted measuring arrangement could measure all shunts in parallel, for instance by means of an open-collector circuit or the like.

The signal-time diagrams shown in FIG. 1, illustrate the signal 1.S from the Hall sensor 1, the signal 3.S representing the voltage drop $U_{M1,2}$ across $R_1$ and $R_2$, and the signal 4.S at the output of the position counter 4.1 and facilitate clarifying the functions.

At the time $t_0$, current flows through the motor M with $S_2$ connected to $U_B$ while $S_1$ is connected to the reference potential through $R_2$ and $R_1$. As the frequency or r.p.m. of the magnetic rotor increases, the signal 1.S from the Hall sensor 1 shows signal flanks corresponding to an increasing r.p.m. of the motor M. The voltage drop $UM_{1,2}$ represents at this time the motor drive current. At time $t_1$, the motor drive voltage $U_B$ is switched off by switching both of the switching devices $S_1$, $S_2$ to the reference potential ⊥. Due to the mass inertia, however, the motor overshoots in the previous direction of motion or rotation, so that in this example embodiment a voltage induction $U_{ind}$ takes place which is in the opposite direction and a corresponding opposite generator current $I_{ind}$ occurs. The opposite generator current $I_{ind}$ diminishes quickly due to the very low-ohmic shunt $R_2$. Even so, between $t_1$ and $t_3$ a further total of, for example, three signal flanks occurs as measured by the Hall sensor 1. The number of signal flanks depends on the mechanical parameters of the driven system. If the direction of the generator current $I_{ind}$ is not detected, one could, at best, allocate these signal flanks occurring after switch-off, to the rotation direction prior to switching off the motor drive voltage $U_B$, or these flanks after switch-off must be ignored. However, by measuring the generator current after the switch-off according to the invention, as a voltage drop $U_{M1,2}$ across $R_1$ and $R_2$ the motion direction can be ascertained. Referring to the signal 3.S initially a negative generator current flows between $t_1$ and $t_2$, but at time $t_2$ a zero crossing occurs and thereafter, until $t_3$, the current $I_{ind}$ has a positive amplitude. This occurs when, after overshooting in the old direction, a spring-back takes place into the new opposite direction of motion. The last of the three signal edges of signal 4.S that occur during $t_1$ to $t_3$ is therefore in the opposite direction. An incorrect assessment would lead each time to a deviation amounting to two steps on the position counter 4. While the motor is being driven externally from $t_0$ to $t_1$, the position counter 4 increments and this continues between $t$, and $t_2$ because of the overshoot (+1, +1). The signal edge that occurs between $t_2$ and $t_3$ is, however, a spring-back (−1) which identifies the opposite direction of motion which the position counter 4 takes into account as (−1).

FIGS. 2a to 2f are time charts of the measured signal 3.S provided at the output of the measuring amplifier 3 for various motion situations of an electrical window lifter that have been measured in this example embodiment. Driving systems other than window lifters such as machine tool drives can be equipped with a system according to the invention for measuring the induced generator current following a short-circuiting of the respective electric drive motor for applying a braking action.

Figure 2A:
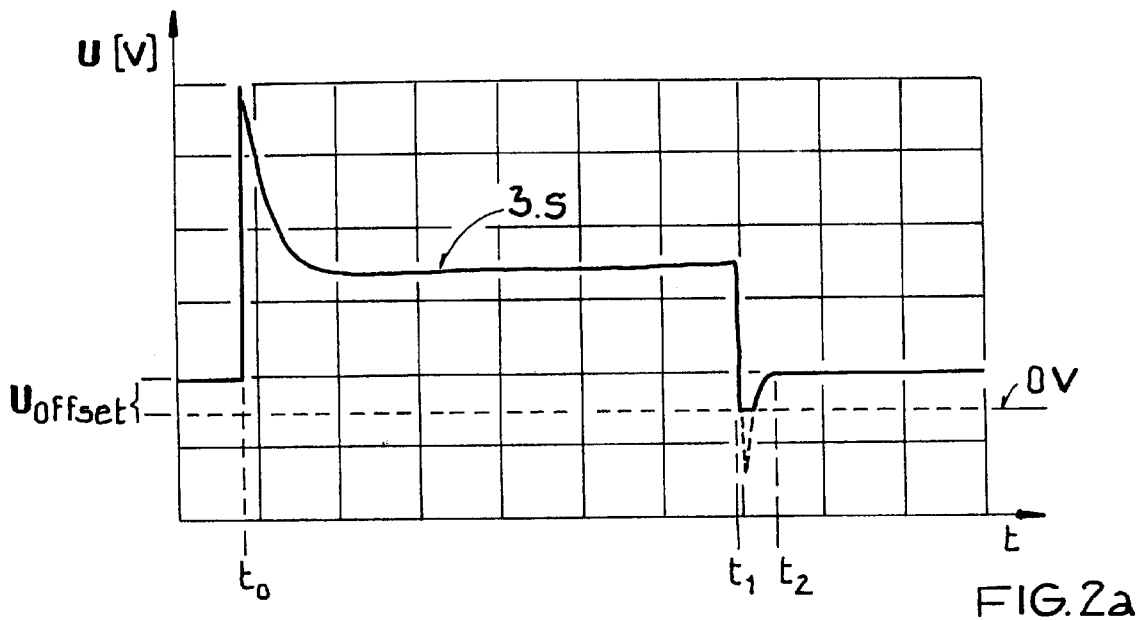
FIGS. 2a to 2f are time charts of the sensed or measured signal 3.S for different motions.

FIG. 2a represents the upward motion or closing motion of a car window during the time from $t_0$ to $t_1$. The motor drive current is measured during this period as represented by the signal 3.S based on the voltage drop $U_{M1,2}$. The signal 3.S initially rises rapidly because the motor is first stationary. The signal then drops as the speed builds up. At time $t_1$, the motor is switched off manually or through software even though the window has not yet encountered an object, such as an upper stop or an obstacle. However, due to the mass inertia of the driven system, an overshoot occurs in the upward direction after switch-off and this overshoot leads to a negative voltage drop at $t_1$ due to the induced generator current. Due to the offset or biasing voltage, however, this drop is shifted into the positive zone and the residual peak drawn with dotted lines is not evaluated: rather, this residual peak is effectively cut off. The item of importance for the evaluation is the sign of the generator current as represented in the amplitude of the measured voltage drop $U_{M1,2}$ and the time taken until the voltage drop reaches the zero level which is approached, for example, by corresponding upper and lower thresholds with a specific tolerance. The tolerances can be used to absorb the commutation noise that invariably occurs with the measuring signal. Similarly, interpolation methods are conceivable for determining $t_2$ and $t_3$. Signal flanks occurring between $t_1$ and $t_2$ can be assigned unambiguously to the old direction of motion, namely the running-up phase.

Figure 2B:
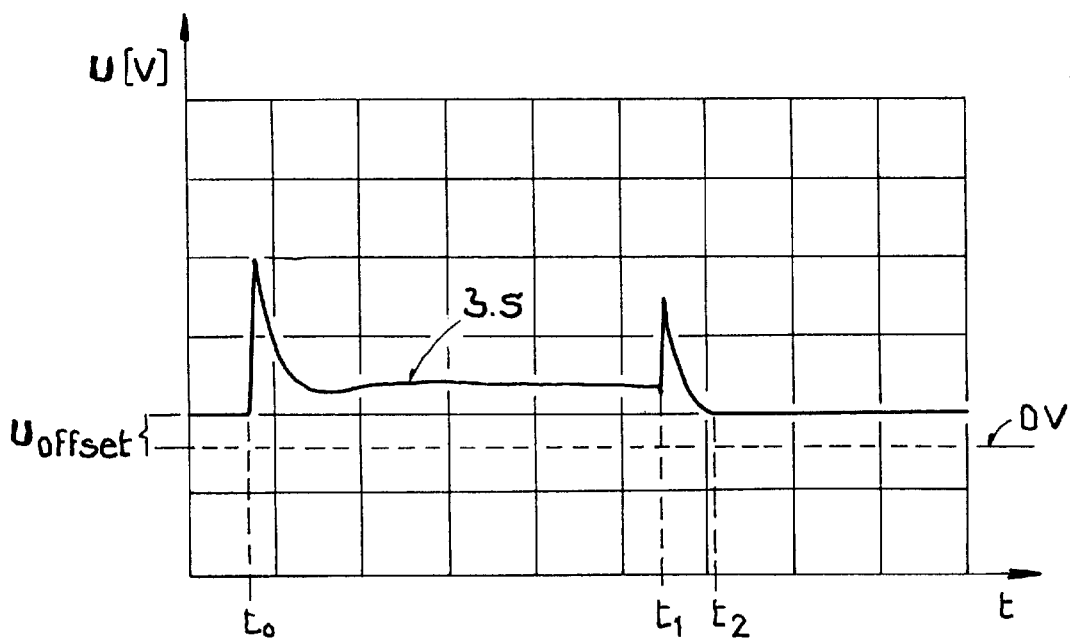

FIG. 2b shows the downward motion or opening of the window with a switch-off either manually or by means of software at time $t_1$ which leads to a positive voltage drop in accordance with the direction of motion because of the generator current between $t_1$ and $t_2$, so that signal flanks which occur between $t_1$ and $t_2$ can also be assigned unambiguously to the previous direction of motion, i.e. the downward motion.

Figure 2C:
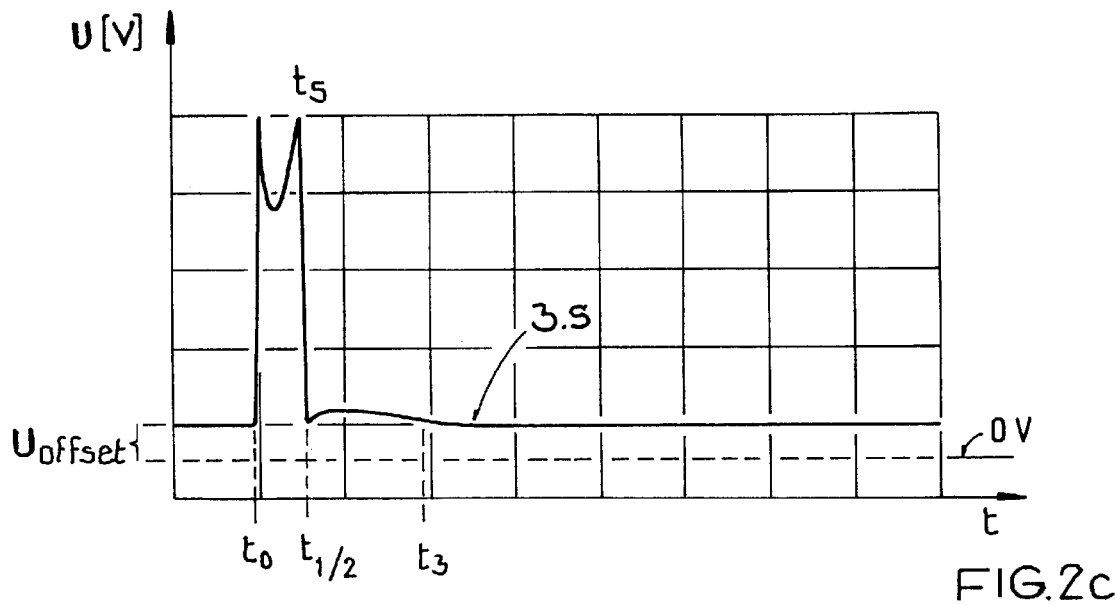

FIG. 2c shows the curve of the measured signal 3.S for the case in which the drive motor is energized to rotate in the original direction even though the window has already encountered a stop or an obstacle. As can be seen from the curve, the motor current or voltage drop decreases briefly and then rises rapidly because the motor is immediately blocked again afer small tolerances or elasticities have been overcome and the speed goes towards zero. Therefore, the current rises correspondingly at $t_5$, limited solely by the internal ohmic resistance of the motor. This is also detected by the evaluation unit 2 and results in a hardware or software switch-off of the motor drive voltage. In this case, the negative voltage drop observed in FIG. 2a does not occur because overshoot is not possible when the motor is blocked. Times $t_1$ and $t_2$ coincide in $t_{1/2}$. By contrast, however, where several window panes are involved spring-back can be observed to a greater or lesser degree depending on the tolerances and elasticities of the various structural units. Therefore, a positive voltage drop as a result of a generator current which at least drops below a threshold at time $t_3$ can also be observed. Tests have shown that in individually tested drive systems signal flanks did indeed occur during this period between $t_{1,2}$ and $t_3$.

These signal flanks were identified as being backwards directed and could, according to the present method, be taken into account in the position counting.

Figure 2D:
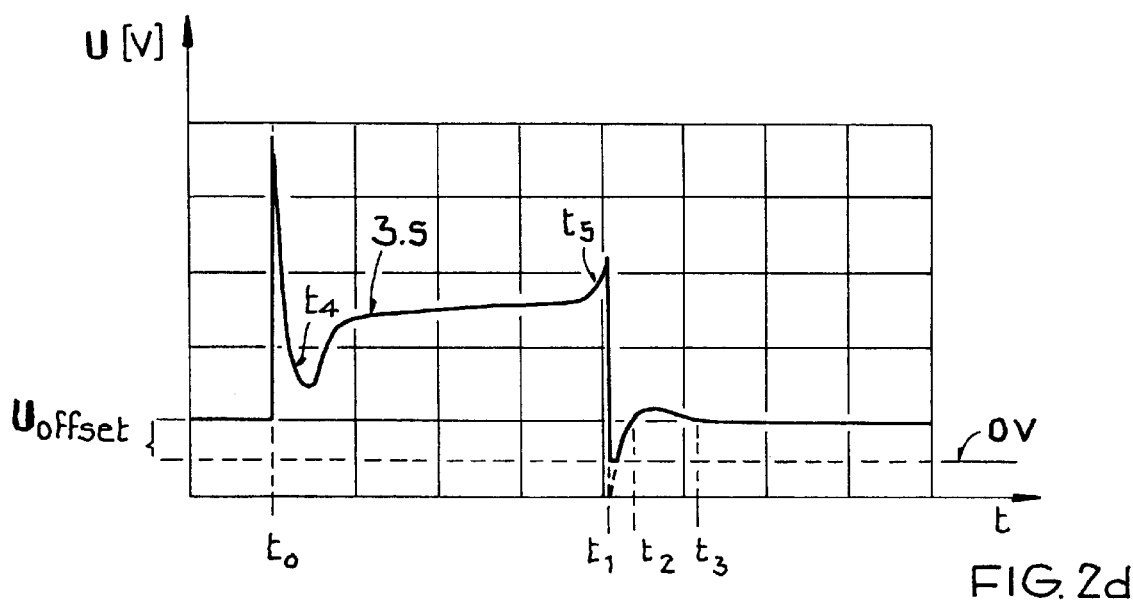

FIG. 2d shows the situation when a slight impact occurs against an obstacle which might even give way elastically during an upward motion of the window, whereby the motor current rises at time $t_5$. However, depending on the upper switch-off threshold the motor is switched-off quickly. In this case, an overshoot can subsequently be observed in the old direction of motor rotation in accordance with the measured negative signal amplitude between $t_1$ and $t_2$ followed by a swing-back between $t_2$ and $t_3$. The rapid drop and subsequent rise to the normal signal level observed at $t_4$ immediately after switching on the motor drive voltage at time $t_0$ is due to a brief idling of the motor when, for example, slip tolerances are overcome between the individually moved drive components.

Figure 2E:
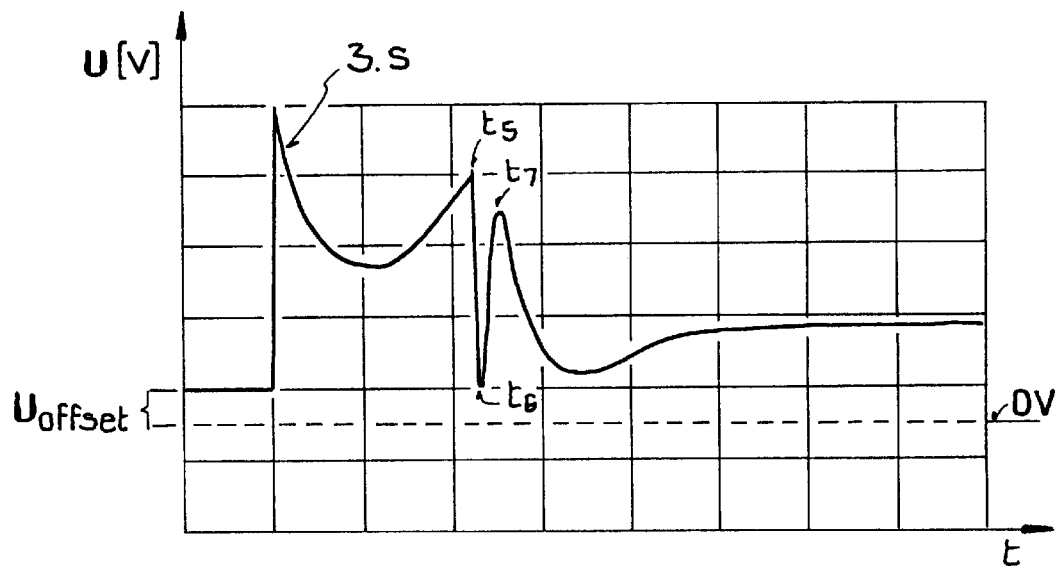

FIG. 2e shows that, by the circuit arrangement according to the invention, not only the classical motor output and the motor stop can be observed but also the sequences that occur when directly changing the polarity of the motor drive voltage by altering the position of the switching devices $S_1$, $S_2$ as taught herein. The voltage, which drops across the measuring resistor $R_1$ connected externally relative to the motor, becomes zero at $t_6$, but after the motor speed falls it rises in the old direction of rotation and reaches a maximum at time $t_7$ which can be evaluated as the time of direction reversal. The amplitude of this maximum is highly dependent on the actual load moment and thresholds should preferably be derived from previous values. This circuit arrangement can thus also detect the time of direction reversal, when changing the polarity of the motor drive voltage without there being a need for additional components for these two basically different methods, apart from the shunt $R_2$ in the short-circuit path. In particular, only one measuring arrangement with a measuring amplifier 3 is required if the evaluation unit 2 is matched accordingly which is readily possible, also in terms of software provided in the form of a microcontroller or microprocessor.

Figure 2F:
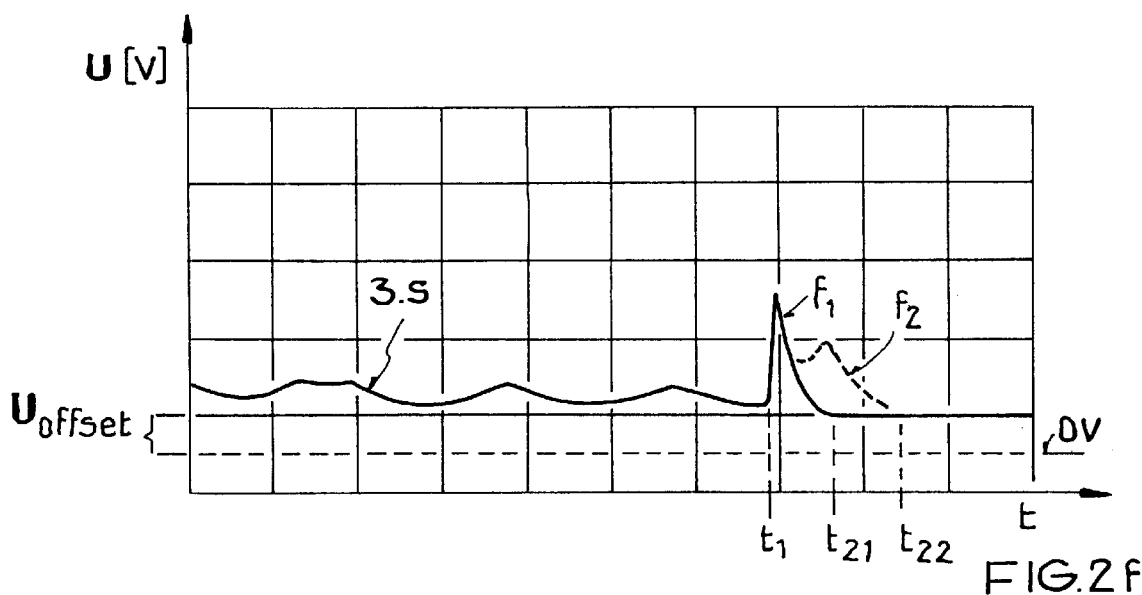

FIG. 2f shows two different signal peaks $f_1$ and $f_2$ of the measured signal in the presence of mechanical disturbances such as those which can occur in the case of a window in a motor vehicle due to unevenness of the ground on which the vehicle travels or in the case of machine tool actuators due to vibration from other machines, etc. In particular when the motor drive voltage is switched off following $t_1$, the overshoot can be extended or shortened by such vibrations. The correct overshoot time $t_{21}$ for $f_1$ and $t_{22}$ for $f_2$ can, however, be determined precisely and signal flanks that arise can be assigned or correlated to the respective motion direction without doubt.

It is also possible to detect, by measuring the generator current or its voltage drop, any movements that occur when the motor is stationary and the motor drive voltage is switched off, and to detect the motion direction to update the position counter accordingly. This feature has the advantage that in the case of machine tool actuators, for example when a movable tool carrier arm is accidentally moved while replacing a tool, an adjustment run becomes unnecessary.

Figure 3:
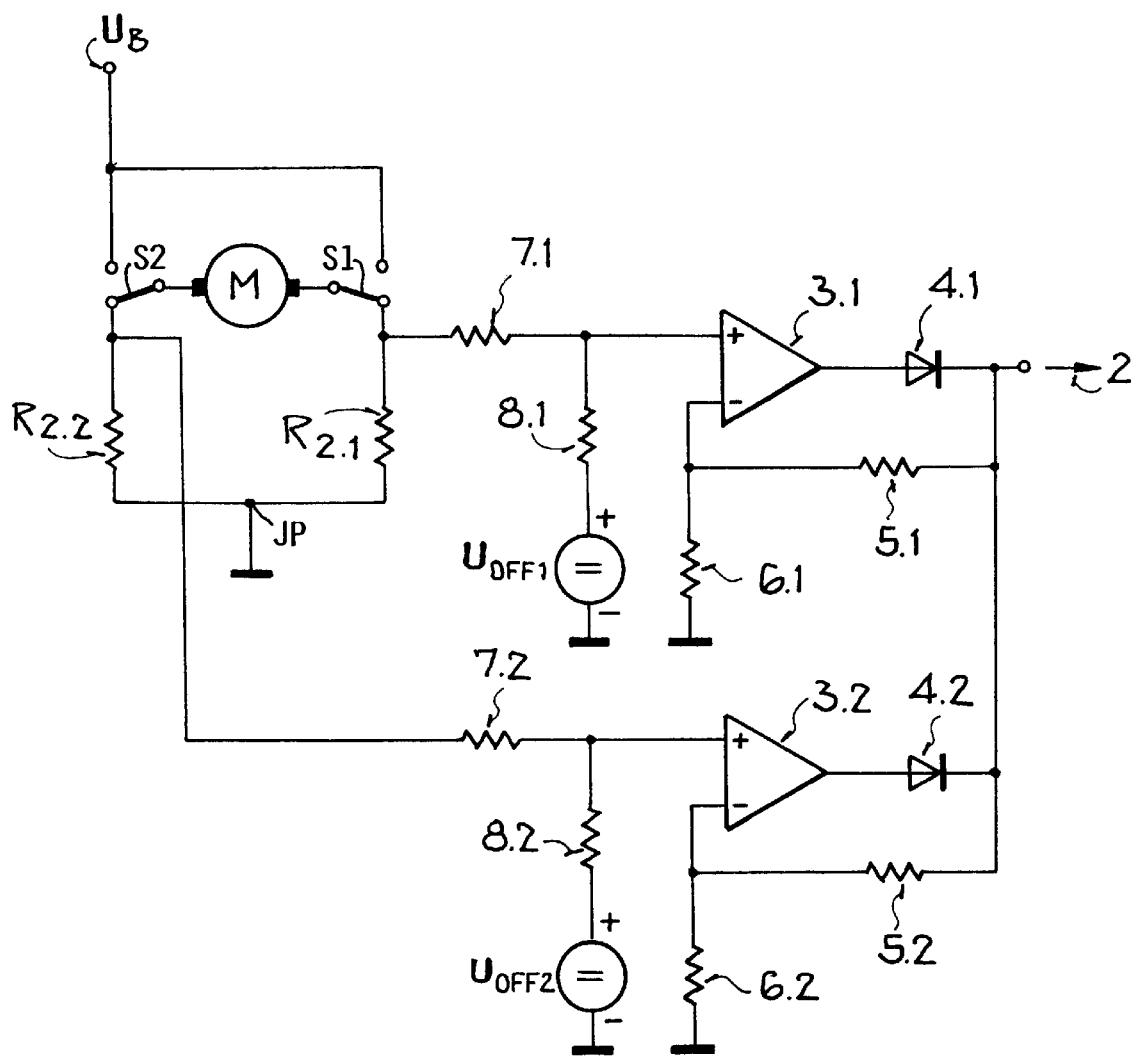
FIG. 3 shows another example embodiment of the present circuit arrangement.

FIG. 3 shows another circuit arrangement according to the invention without a measuring resistor $R_1$. Instead, the shunt resistor $R_2$ is divided and connected through a junction point JP to ground or reference potential as shown at $R_{2.1}$ and $R_{2.2}$. The other end of the resistors $R_{2.1}$ and $R_{2.2}$ is connectable through the respective switch $S_1$, $S_2$ to the corresponding motor winding terminal. The special advantage of the circuit of FIG. 3 is that while the motor drive voltage is connected the electrical resistance is the same in both directions of rotation if $R_{2.1}$ and $R_{2.2}$ have identical resistances. Only one measuring amplifier 3 is necessary across one of the two shunts $R_{2.1}$ or $R_{2.2}$ to measure the generator current. However, for monitoring the motor drive mode two identical measuring amplifiers 3.1 and 3.2 are preferred as shown and even necessary. These measuring amplifiers of identical design have a special feedback feature through resistors 5.1 and 5.2, respectively. Again, offset voltages $U_{off1}$ and $U_{off2}$ are applied in each case as a direct component across the resistors 8.1 and 8.2 at the respective positive input of the measuring amplifiers 3.1 and 3.2 which are constructed as operational amplifiers. The negative input incorporates the feedback with a reference to reference potential ⊥ across the resistors 6.1 and 6.2.

The outputs of the measuring amplifiers 3.1 and 3.2 can be coupled together as a "wired analog OR" by providing a diode 4.1 and 4.2 respectively in the output circuits of the amplifiers, whereby only one separate input is required for connecting the evaluation unit 2 to the amplifiers 3.1 and 3.2, instead of two. However, the superimposed OR signals must be allocated to the respective polarity of the connected motor drive voltage because these OR-signals do not differ from one another. In the generator mode, however, the current flows through $R_{2.1}$ and $R_{2.2}$ in a loop so that the voltage drops measured against a reference potential have an opposite sign and therefore only the positive current signal is transferred. If the evaluation unit 2 has two separate inputs, however, the direction of motion can again be derived directly from the signals of the measuring circuit i.e. the amplifiers 3.1 and 3.2.

Figures 4, 4A:
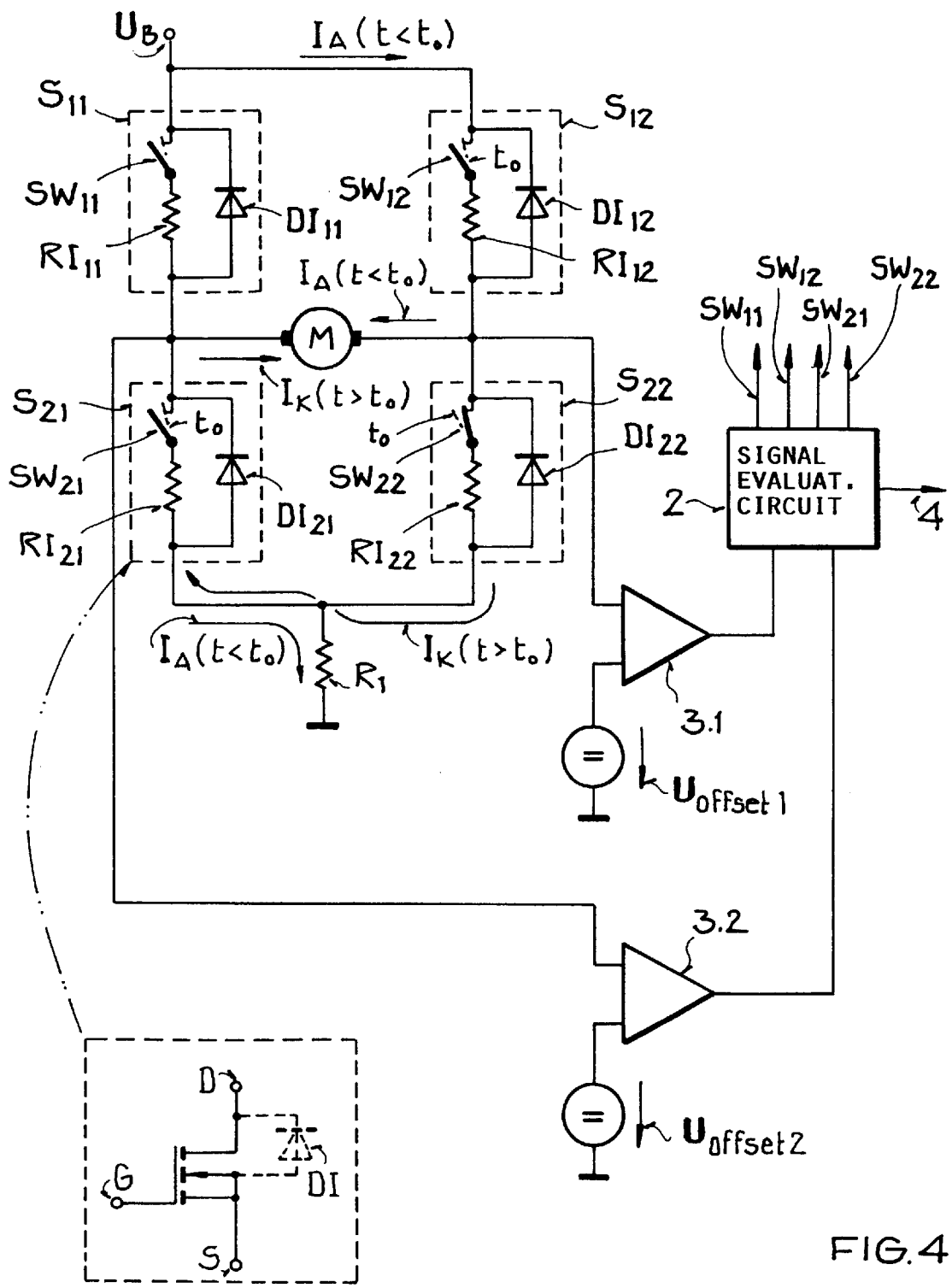
FIG. 4 illustrates a circuit arrangement with four switching devices connected in an H bridge to the motor with a shunting diode poled in the reverse direction in each bridge branch.
FIG. 4a shows a switching device of a MOSFET-transistor arrangement with the substrate connected to the source thereby inherently forming a diode.

FIG. 4 shows another circuit arrangement for implementing the present method. Four switching devices $S_{11}$, $S_{12}$, $S_{21}$, $S_{22}$ are connected in the form of an H bridge to the two winding terminals of the motor M. The switching devices $S_{11}$ and $S_{12}$ are connected to the motor drive voltage $U_B$. The switching devices $S_{21}$ and $S_{22}$ are also connected to the reference potential ⊥ through a junction point JP and the resistor $R_1$. For energizing the motor M, either $S_{11}$ and $S_{22}$ are closed for driving the motor in one direction, or $S_{12}$ and $S_{21}$ are closed for driving the motor in the opposite direction.

The switching devices $S_{11}$, $S_{12}$, $S_{21}$ and $S_{22}$ are MOSFET transistors whose substrate terminal B is connected to the source S, such as a battery, as shown in FIG. 4a. FIG. 4a also shows in dashed lines that within the MOSFETs an inherent diode DI is formed which is connected in each case in the reverse direction from drain D to source S and thus conducts no current when the switching device is open while the motor M rotates in the opposite direction.

To illustrate the function, in FIG. 4 in place of the MOSFETs for the switching devices $S_{11}$, $S_{12}$, $S_{21}$ and $S_{22}$ an equivalent circuit is shown comprising a switch $SW_{11}$, $SW_{12}$, $SW_{21}$ or $SW_{22}$. Each equivalent circuit has a respective internal resistor $RI_{11}$, $RI_{12}$, $R_{21}$ or $RI_{22}$. A diode $DI_{11}$, $DI_{12}$, $DI_{21}$, or $DI_{22}$ is connected in parallel to the respective series connection of the switch and resistor.

Figure 5:
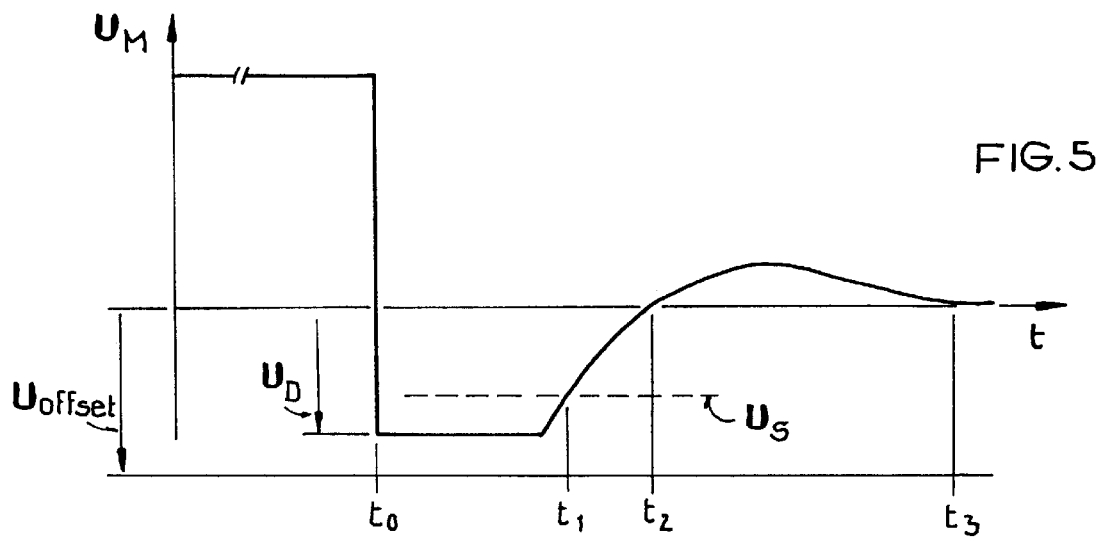
FIG. 5 illustrates the measuring voltage curve before and after stopping the motor, for a circuit according to FIG. 4.

The speed-proportional signal flanks shown in FIG. 4 are measured by a Hall generator 1 as shown in FIG. 1, but not shown in FIG. 4. The output signal from the Hall generator 1 is supplied to the evaluating unit 2 which also is connected to the two measuring amplifiers 3.1 and 3.2 which measure the voltage drop $U_M$ across the diodes $D_{22}$ and $D_{21}$ in the event of a short-circuit. Additionally during normal operation the voltage drop across $R_1$ is measured. The evaluation unit 2 has outputs for driving the switches $SW_{11}$–$SW_{22}$ and transfers the information relating to speed and direction of rotation derived from the signal edges of the Hall sensor signal and the respective voltage drop to the position counter 4, please also see FIG. 1. The measuring amplifiers 3.1 and 3.2 can have a voltage offset $U_{offset1,2}$ which causes the voltage signal $U_M$, described in more detail below, to rise by this amount $U_{offset}$ compared with the reference potential, see. FIG. 5.

The sequences that take place in accordance with the present method will now be described with reference to FIGS. 4, 5 and 6; FIG. 5 shows the voltage drop $U_M$ that can be measured by the measuring amplifiers 3.2 and FIG. 6 shows the time curve of the control of the switching devices $S_{11}$ to $S_{22}$.

The motor M is to be stopped at time $t_0$. Before the stopping when $t<t_0$, the motor is driven in one direction of rotation when switches $SW_{12}$ and $SW_{21}$ are closed thus causing the motor drive current $IA(t<t_0)$ to flow from $U_B$ through $SW_{12}$ to the motor M and from there through $SW_{21}$ and $R_1$ to ground. The switches $SW_{11}$ and $SW_{22}$ are open and the inherent diodes $DI_{11}$ and $DI_{22}$ are polarized in the reverse direction.

The drive current $Ia(t<t_0)$ generates a voltage drop $U_M$ across resistor $R_1$. This voltage drop is measured by the measuring amplifier 3.2, as shown in FIGS. 4 and 5.

Figure 6:
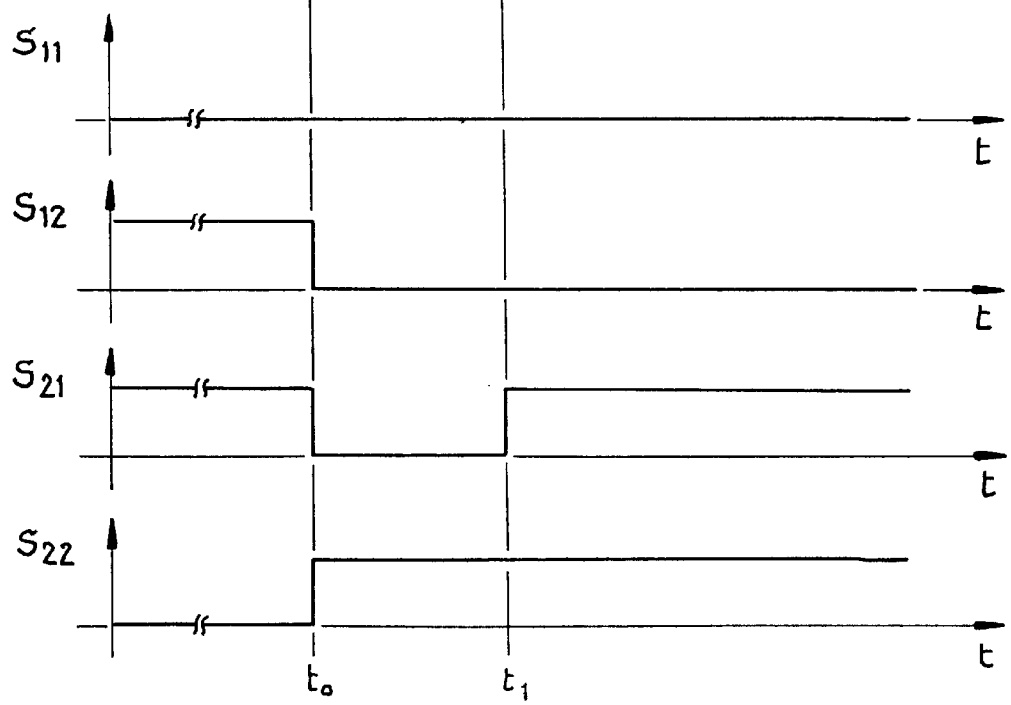
FIG. 6 shows the timing for driving the switching devices in accordance with FIGS. 4 and 5.

At time $t_0$, switches $SW_{11}$ $SW_{12}$ and $SW_{21}$ are opened while switch $SW_{22}$ is closed, as shown in FIGS. 4 and 6. Due to the generator principle and the mass inertia, the motor now produces a generator voltage which is short-circuited to bring the motor to a rapid stop. This short-circuit is provided across the closed switch $SW_{22}$ and the diode $DI_{21}$ of the MOSFET switching device $S_{21}$, as indicated by the short-circuit current $I_K(t>t_C)$. The induced generator voltage is polarized opposite to the polarization of the motor drive voltage ($U_S \rightarrow \perp$) whereby diode $DI_{21}$ becomes conductive to close the short circuit. The particular advantage of this bridging compared to a short-circuit across a shunt $R_2$ as shown in FIG. 1 is, for a voltage above the diode conductive-state voltage, the very low internal resistance of the diode $DI_{21}$ so that the voltage drop exceeds the conductive state voltage by only an insignificant amount and a relatively high short-circuit current can flow thus stopping the motor in a correspondingly shorter time. If the voltage drop across the diode falls at $t_1$ below a preset threshold $U_S$, which can approximately equal the diode conductive state voltage $U_D$ the second switch $SW_{21}$ connected to reference potential is also closed in the short-circuit loop (see FIG. 6) which is connected in parallel to diode $DI_{21}$. The now measurable voltage drop $U_M$ is a drop only across the internal resistor RI of the switching device $S_{21}$.

At time $t_2$, the current reaches zero and the motor M stops. This can, however, be followed by a spring-back of the motor or associated drive components so that again a generator voltage of opposite polarity occurs which can always be measured across the internal resistor RI of the closed switching devices $S_{21}$ and $S_{22}$ and further signal flanks that arise can be correlated to a direction of rotation in accordance with the sign of the induced generator voltage. If the mechanical components are designed appropriately, this spring-back can also be neglected by not evaluating signal flanks that arise after $t_1$ or $t_2$ or by simply assigning them all to the opposite direction of motion.

Although the invention has been described with reference to specific example embodiments, it will be appreciated that it is intended to cover all modifications and equivalents within the scope of the appended claims. It should also be understood that the present disclosure includes all possible combinations of any idividual features recited in any of the appended claims.

What is claimed is:

1. A method for detecting at least one motion direction of a drivable component driven by an electric motor, said method comprising the following steps:
   (a) energizing said electric motor for rotation in a desired direction of rotation by applying a respectively polarized motor drive voltage to said electric motor,
   (b) switching off said polarized motor drive voltage and simultaneously short-circuiting said electric motor while a rotor of said electric motor continues to rotate by reason of inertia thereby generating an induced generator current while the motor is short-circuited,
   (c) sensing, while said short-circuiting continues, said induced generator current to provide a motion signal that contains motion and motion direction information regarding said drivable component, and
   (d) evaluating said motion signal to obtain said motion and direction information for further use.

2. The method of claim 1, further comprising the step of sensing flank signals generated by flanks of a signal that is proportional to an r.p.m. of said electric motor and counting said flank signals to provide position representing signals, and performing said evaluating step of said motion signal with reference to said position representing signals to further obtain present motion, direction and position information of said drivable component.

3. The method of claim 2, further comprising allocating said flank signals occurring immediately following said short-circuiting, to said desired direction of rotation until a point of time when the induced generator current ($I_{ind}$) falls for the first time below a given threshold.

4. The method of claim 3, comprising ignoring any flank signals occurring following said point of time when the induced generator current falls below said given threshold.

5. The method of claim 3, further comprising allocating any flank signals occurring following said point of time when said induced generator current falls below said given threshold, to a motion direction opposite to said desired direction of rotation.

6. The method of claim 3, further comprising allocating any flank signals occurring following said point of time to a motion direction that corresponds to the polarization of said induced generator current.

7. The method of claim 1, further comprising the following steps;
(a) switching off said polarized motor drive voltage while said motor is still rotating in said desired direction of rotation,
(b) performing said simultaneous short-circuiting of said electric motor by an electric circuit element that produces a generator voltage drop ($U_M$) representative of said generator current flowing through said electric circuit element,
(c) measuring said generator voltage drop ($U_M$),
(d) measuring a time duration ($t_0$–$t_1$) during which said electric motor is still rotating by inertia in said desired direction of rotation following said switching off of said polarized motor drive voltage,
(e) counting flank signals occurring during said time duration ($t_0$–$t_1$), and
(f) allocating said flank signals to a respective motion direction.

8. The method of claim 7, comprising using as said electric circuit element for said simultaneous short-circuiting of said electric motor a diode poled in a conducting direction for said generator voltage drop ($U_M$) and measuring said generator voltage drop ($U_M$) across said diode to obtain said induced generator current.

9. The method of claim 8, further comprising the step of closing at the end of said time duration ($t_0$–$t_1$) when said inertia rotation ends, a further electric circuit element connected in parallel to said diode for monitoring further flank signals occurring following an end of said time duration ($t_0$–$t_1$).

10. The method of claim 9, wherein said further flank signals are ignored in a determination of a motion direction.

11. The method of claim 9, wherein said further flank signals are allocated to a motion direction opposite to said desired motion direction.

12. The method of claim 9, comprising using an internal resistance of said further electric circuit element for causing a voltage drop having a polarity (+or −), and allocating said further flank signals to that motion direction which corresponds to said polarity.

13. A circuit arrangement for measuring an induced generator current that is induced by inertia rotation of a rotor of an electric motor following stopping said electric motor by switching-off a polarized motor drive voltage and simultaneously short-circuiting said electric motor, said circuit arrangement comprising an electric motor, a drive voltage source ($U_B$) for providing said polarized motor drive voltage, switching means for operatively connecting windings of said electric motor to said operating voltage source and to a reference potential for normally driving said electric motor to rotate in a desired direction of rotation, at least one voltage drop producing electric circuit element operatively connected to said electric motor, said switching means being further disconnectable from said operating voltage source and connectable for said simultaneous short-circuiting of said electric motor through said at least one voltage drop producing electric circuit element for inducing a voltage drop that is proportional to said induced generator current, and at least one electric measuring circuit (3, 3.1, 3.2) connected to said voltage drop producing electric circuit element for measuring said voltage drop and for producing a measured signal representing said induced generator current while said motor is short-circuited.

14. The circuit arrangement of claim 13, further comprising a sensor (1) for sensing a motor r.p.m. to provide a respective r.p.m. signal having signal flanks, a signal evaluating circuit (2) having a first input connected to said sensor (1) for receiving said respective r.p.m. signal, and a second input connected to an output of said at least one electric measuring circuit for receiving said measured signal representing said induced generator current, said signal evaluating circuit processing said r.p.m. signal and said measured signal for producing an output signal providing information regarding a motion, motion direction and position of a component driven by said electric motor.

15. The circuit arrangement of claim 13, wherein said switching means comprise a first pair of switches ($S_{11}$; $S_{12}$) each having one terminal connected in common to said drive voltage source ($U_S$) and a further terminal connected to a respective winding of said windings of said electric motor, and a second pair of switches ($S_{21}$, $S_{22}$) each having one terminal connected to a junction point (JP), a resistor ($R_1$) connected to said junction point (JP) and to said reference potential, each switch of said second pair of switches ($S_{21}$, $S_{22}$) comprising a further terminal connected to a respective winding of said windings of said electric motor for driving said electric motor in a rotation direction which depends on which switch of each pair is closed and which switch of each pair is open, and wherein said at least one voltage drop producing electric circuit element comprises a diode ($DI_{21}$, $DI_{22}$) connected in parallel at least to each switch of said second pair of switches ($S_{21}$, $S_{22}$), and wherein each diode ($DI_{21}$, $DI_{22}$) is poled to be normally non-conductive toward said junction point (JP).

16. The circuit arrangement of claim 13, wherein said switching means comprise switches ($S_{11}$, $S_{12}$, $S_{21}$, $S_{22}$) forming a first and a second pair of switches, each of said switches comprising an inherent internal resistance ($RI_{11}$; $RI_{12}$; $RI_{21}$; $RI_{22}$) for measuring said voltage drop across said inherent internal resistance.

17. The circuit arrangement of claim 13, wherein said switching means comprise switches forming a first and a second pair of switches, and wherein each of said switches is an enhancement type MOSFET including an inherent diode formed by a source and substrate connection.

18. The circuit arrangement of claim 13, wherein said voltage drop producing electrical circuit element comprises at least one measuring resistor connected to said at least one electric measuring circuit for measuring said induced generator current as a voltage drop across said measuring resistor.

19. The circuit arrangement of claim 18, wherein said at least one measuring resistor ($R_3$) is connected in series with said motor (M) when said motor is short-circuited.

20. The circuit arrangement of claim 18, wherein said at least one measuring resistor ($R_2$) is connected in parallel with said motor when said motor is short-circuited.

21. The circuit arrangement of claim 18, comprising two measuring resistors ($R_{2.1}$; $R_{2.2}$) both connected at one resistor end to said reference potential and at the other resistor end to a respective winding terminal of said electric motor through said switching means.

22. The circuit arrangement of claim 21, wherein said two measuring resistors ($RI_{21}$; $RI_{22}$) are inherent in said switching means ($S_{21}$; $S_{22}$), and further comprising two electric measuring circuits (3.1; 3.2) connect to said windings of said electric motor.

23. The circuit arrangement of claim 13, wherein said at least one voltage drop producing electric circuit element comprises a measuring resistor ($R_2$) connected to said motor (M) when said motor is short-circuited, and comprising a further measuring resistor ($R_1$) connecting said first mentioned measuring resistor ($R_2$) to said reference potential, and wherein said at least one electric measuring circuit is connected for measuring a voltage drop ($U_{M1,2}$) across both said measuring resistors ($R_1$, $R_2$).

24. The circuit arrangement of claim 13, wherein said at least one voltage drop producing electric circuit element comprises one or more resistors having a low impedance.

25. The circuit arrangement of claim 24, wherein said low impedance is less than 1 OHM.

26. The circuit arrangement of claim 24, wherein said one or more resistors are part of a printed circuit.

27. The circuit arrangement of claim 14, wherein said at least one electrical measuring circuit comprises an amplifier, an off-set biasing voltage source connected to one input of said amplifier for biasing said amplifier in such a way that any occurring voltage drop is shifted at least partly into a positive range to provide a positive output signal at an output of said amplifier connected to said signal evaluating circuit (2).

28. The circuit arrangement of claim 13, wherein said at least one voltage drop producing electric circuit element is an inherent resistance ($R_3$) of the circuit arrangement, and wherein said inherent resistance ($R_3$) is connected in series with said electric motor.

29. The circuit arrangement of claim 13, wherein said at least one voltage drop producing electric circuit element comprises two measuring resistors ($R_{2.1}$; $R_{2.2}$) connected in parallel to said electric motor between said reference potential and through a respective winding of said electric motor for producing a voltage drop.

* * * * *